(12) United States Patent
Guillaume et al.

(10) Patent No.: US 11,787,127 B2
(45) Date of Patent: Oct. 17, 2023

(54) METHOD OF MANUFACTURING A GRILLE FOR A THRUST REVERSER

(71) Applicant: Hutchinson, Paris (FR)

(72) Inventors: Basile Guillaume, Montargis (FR); Jean-Christophe Rietsch, Corbeil Essonnes (FR); Kevin O'Brien Gaw, Bourron-Marlotte (FR); Thomas Patillaut, Melleroy (FR)

(73) Assignee: Hutchinson, Paris (FR)

( * ) Notice: Subject to any disclaimer, the term of this patent is extended or adjusted under 35 U.S.C. 154(b) by 606 days.

(21) Appl. No.: 16/851,750

(22) Filed: Apr. 17, 2020

(65) Prior Publication Data

US 2020/0331213 A1 Oct. 22, 2020

(30) Foreign Application Priority Data

Apr. 17, 2019 (FR) ...................................... 1904127

(51) Int. Cl.
*B29C 70/02* (2006.01)
*B29C 43/14* (2006.01)
(Continued)

(52) U.S. Cl.
CPC .......... *B29C 70/021* (2013.01); *B29C 43/146* (2013.01); *F02K 1/64* (2013.01);
(Continued)

(58) Field of Classification Search
CPC ......... B29C 2043/147; F05D 2240/129; F02K 1/64; F02K 1/68; F02K 1/72
(Continued)

(56) References Cited

U.S. PATENT DOCUMENTS 9,587,582 B1 * 3/2017 Schaefer .................. F02K 1/72
10,995,699 B2 * 5/2021 Roach ...................... F02K 1/54
(Continued)

FOREIGN PATENT DOCUMENTS

EP 1 118 763 A2 7/2001
EP 2 944 452 11/2015
(Continued)

OTHER PUBLICATIONS

Search Report for French Application No. FR 1904127 dated Dec. 16, 2019, 2 pages.

*Primary Examiner* — Matthew J Daniels
*Assistant Examiner* — Gregory C. Grosso
(74) *Attorney, Agent, or Firm* — Alston & Bird LLP (57) ABSTRACT

The invention proposes a method for manufacturing a grille for a cascade type thrust reverser, of a jet engine, said method including the following steps:
a) manufacturing a first component comprising continuous or long fibres, pre-impregnated by a thermoplastic or thermosetting resin;
b) manufacturing, subsequently or together with step a), a series of second components each including discontinuous fibres, pre-impregnated by a thermoplastic or thermosetting resin, step b) being carried out such that the second components are, on the one hand, arranged transversally with respect to a longitudinal direction of the first component on at least one side of the first component and, on the other hand, spaced from one another according to this longitudinal direction, so as to form a comb-shaped structure, wherein the second components are consolidated to the first component.

18 Claims, 12 Drawing Sheets

(51) Int. Cl.
*F02K 1/64* (2006.01)
*B29K 63/00* (2006.01)
*B29K 79/00* (2006.01)
*B29K 105/12* (2006.01)
*B29K 307/04* (2006.01)
*B29L 31/30* (2006.01)

(52) U.S. Cl.
CPC .......................... *B29C 2043/147* (2013.01); *B29C 2793/0072* (2013.01); *B29C 2793/0081* (2013.01); *B29K 2063/00* (2013.01); *B29K 2079/085* (2013.01); *B29K 2105/12* (2013.01); *B29K 2307/04* (2013.01); *B29L 2031/3076* (2013.01)

(58) Field of Classification Search
USPC ...................................................... 29/890.01
See application file for complete search history.

(56) References Cited

U.S. PATENT DOCUMENTS

| | | | |
|---|---|---|---|
| 2016/0186689 A1* | 6/2016 | Bartel | B29C 53/824 264/296 |
| 2016/0263820 A1* | 9/2016 | Kruckenberg | F02K 1/64 |
| 2018/0340492 A1* | 11/2018 | Harpal | F02K 1/72 |
| 2020/0032663 A1* | 1/2020 | Kruckenberg | F02K 1/64 |
| 2020/0088133 A1* | 3/2020 | Davis | B29C 33/485 |

FOREIGN PATENT DOCUMENTS

| | | |
|---|---|---|
| EP | 3 406 887 A1 | 11/2018 |
| FR | 3 048 025 A1 | 8/2017 |

\* cited by examiner

METHOD OF MANUFACTURING A GRILLE FOR A THRUST REVERSER

CROSS-REFERENCE TO RELATED APPLICATIONS

This application claims priority to French Application No. 1904127 filed Apr. 17, 2019 and entitled "Procédé de fabrication d'une grille pour un inverseur de poussée", which application is hereby incorporated by reference herein in its entirety.

TECHNICAL FIELD OF THE INVENTION

The present invention relates to the field of thrust reversers, in particular on aircraft jet engines.

A thrust reverser is used during the landing of an aircraft equipped with jet engines to decelerate the aircraft. More specifically, a thrust reverser makes it possible to redirect the airflow entering into the jet engine in a direction substantially opposite the forward direction of the aircraft during landing, and thus help with decelerating the aeroplane.

TECHNICAL BACKGROUND

There are different types of thrust reversers.

The thrust reverser considered as being the more efficient is called "cascade". A "cascade" is formed of a plurality of grilles, arranged to the side of one another on the periphery of the nacelle of the jet engine, each grille being attached on the nacelle.

A thrust reverser of this type is generally installed halfway along the nacelle of the jet engine.

Figures 1A, 1B:
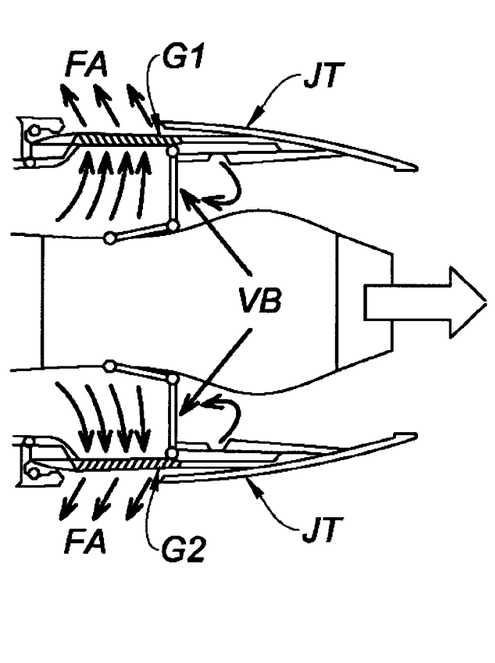
FIGS. 1a-1b represent a cross-sectional view of a jet engine of an aircraft, on the one hand in flight, and the other hand, at the time of landing.

FIG. 1 represents a cross-sectional view of a jet engine of an aircraft, on the one hand, in flight in FIG. 1(a) and on the other hand, at the time of landing in FIG. 1(b).

The comparison of the two figures makes it possible to see the effect of the "cascade" type thrust reverser.

Indeed, upon landing, a translatable skirt JT of the nacelle is moved at the same time as a blocking section VB such that the airflow FA is redirected towards the grilles G1, G2 of the thrust reverser.

Figure 2:
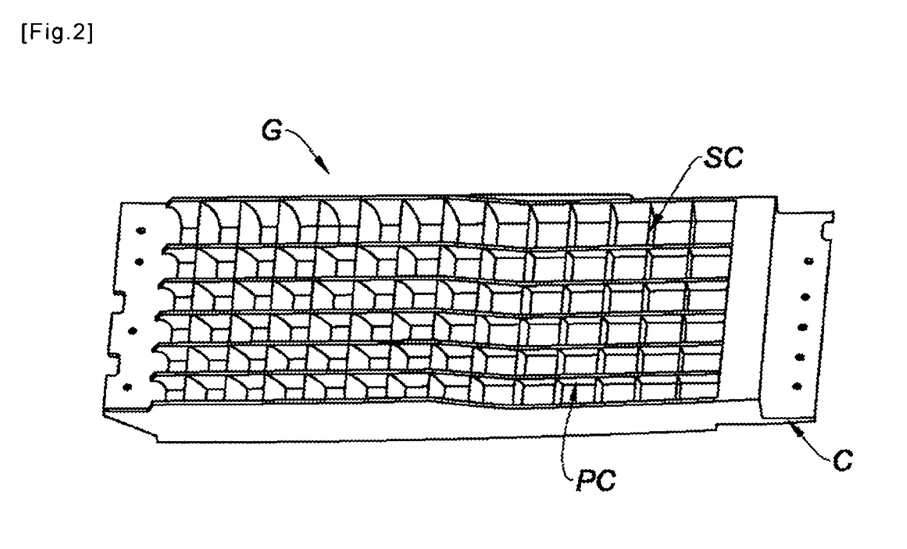
FIG. 2 represents, according to a perspective view, a typical grille G of a "cascade" type thrust reverser.

FIG. 2 represents, according to a perspective view, a typical grille G of a "cascade" type thrust reverser.

A grille G of a "cascade" type thrust reverser comprises first components PC, called spars or "strongbacks", which extend, once the thrust reverser installed on a jet engine, according to the longitudinal direction of the engine, second components SC, called blades or "vanes", according to the terminology, which extend transversally with respect to the first components and therefore according to the periphery of the jet engine, as well as generally, as is the case in FIG. 2, a frame C for these first components PC and second components SC.

Currently, these grilles are made of composite material, namely with fibres pre-impregnated by a resin.

All of the components contribute to the mechanical strength in the redirection of the airflow in the opposite forward direction of the aircraft during a landing.

The manufacturing of a grille of a "cascade" type thrust reverser made of composite material is particularly complex.

Indeed, this requires a lot of steps, in particular manual, certain steps could furthermore involve an expensive tooling.

Generally, the current techniques consist of:
a) manufacturing the first components or strongbacks on the one hand,
b) manufacturing the second components or vanes on the other hand, then
c) assembling the second components to the first components.

It is, for example, which is proposed in document U.S. Pat. No. 9,587,582 B1 (D1).

In this document, the first components can be manufactured individually or made of one single part by different techniques such as low-pressure injection moulding of resin (more known by the acronym RTM "Resin Transfer Moulding"), pultrusion or by compression moulding.

In this document also, the second components are manufactured, either from a block which is then cut into different individual components, or by individually forming each of the second components. Whatever the method used, the block or each second component manufactured individually can be obtained by RTM or compression moulding.

Still in this document, the assembly of the second components to the first components is then carried out by sliding each of the second components into receiving slots provided in the first components. The holding of each of the second components on the first components must then be ensured using a structural adhesive.

Once steps a), b) and c) carried out, the frame of the grille must furthermore finally be formed in a subsequent step.

It is understood that this method is long to implement, in particular due to each of the second components (vanes) having to be inserted or slid between two first components (strongbacks).

Document FR 3 048 025 A1 (D2) also proposes a method according to steps a), b) and c) above.

The particularity of this method resides in the manufacturing of the second components. Indeed, to carry out each of the second components, a preform is started with, made of composite material, pre-impregnated with a resin, then an operation is carried out, stamping to the desired shape.

In an embodiment, each of the second components is then installed on the first is components and an operation of welding these is finally carried out.

From these steps a), b) and c), a frame must thus be provided, on which the first and second components can be fixed.

The manufacturing time can thus be brought closer to that of document D1.

Document EP 2 944 452 (D3) also proposes a method according to steps a), b) and c) mentioned above.

However, here the second components are not presented as individual components which are then assembled to the first components, but as components (vanes) connected together by way of a frame to form a ladder or rack-shaped structure (FIG. 7 or FIG. 8 of this document). The ladder or rack-shaped structure is then assembled to an assembly including first components (strongbacks) with a frame (FIG. 6 of this document).

The assembly of the first components with its frame (FIG. 6 of this document) can be obtained by compression moulding.

Similarly, the assembly of the second components with its frame to form the ladder or rack-shaped structure (FIG. 7 of this document) can be carried out by compression moulding.

This is advantageous with respect to the solution proposed in document D1 or document D2, regarding the operation number to be carried out, in particular manually.

In addition, the frame of the grille is finally formed at the same time as the first and second components, contrary to what is proposed in documents D1 and D2.

However, in order to ensure the co-consolidation of the two assemblies (assembly of FIG. 7 or of FIG. 8, on the one hand, on the assembly of FIG. 6, on the other hand), a particular tool, more complex, based on a mandrel is used. This mandrel is moreover soluble, therefore not reusable, which increases the costs.

An aim of the invention is to propose a method for manufacturing a grille for a "cascade" type thrust reverser which is inexpensive over time and requiring a relatively simple tool.

This would indeed make it possible to decrease the manufacturing costs of such a grille.

SUMMARY OF THE INVENTION

In order to resolve the abovementioned aim, the invention proposes a method for manufacturing a grille for a cascade type thrust reverser, of a jet engine, said method comprising the following steps:

a) manufacturing a first component including continuous or long fibres, pre-impregnated by a thermoplastic or thermosetting resin;

b) manufacturing, subsequently or together with step a), a series of second components each including discontinuous fibres, pre-impregnated by a thermoplastic or thermosetting resin, step b) being carried out such that the second components are, on the one hand, arranged transversally with respect to a longitudinal direction of the first component on at least one side of the first component and, on the other hand, spaced from one another according to this longitudinal direction, so as to form a comb-shaped structure, wherein the second components are consolidated to the first component.

The method according to the invention can also comprise at least one of the following features, taken individually or in combination:
- a first component manufactured during step a) comprises a series of notches, each notch receiving a second component;
- step b) furthermore consists of securing second components to the associated first component on a second side of the first component, the second side being opposite the first side;
- the method further comprises the following steps:
c) repeating steps a) and b) at least once, in order to obtain at least one other comb-shaped structure, wherein the second components are consolidated to the first component;
d) arranging said comb-shaped structures obtained beforehand on a frame configured to be attached to said jet engine; and
e) securing the comb-shaped structures to said frame.
- two second components, advantageously from step c), of two different comb-shaped structures, are secured to one another, for example, by welding and/or by bonding and/or by complementing shapes;
- the frame comprises notches or, according to the case of lugs, to receive each comb-shaped structure;
- four sides which are fixed, two-by-two, by removable fastening means;
- the frame comprises continuous fibres or long fibres, pre-impregnated by a thermoplastic or thermosetting resin;
- step a) comprises the following sub-steps:
$a_1$) providing at least one sheet made with continuous fibres, pre-impregnated by a thermoplastic or thermosetting resin;
$a_2$) placing said at least one sheet in a mould;
$a_3$) compression moulding said at least one sheet in the mould to obtain the first component.
  step b) comprises the following sub-steps:
$b_1$) providing at least one second sheet made with continuous fibres, pre-impregnated by a thermoplastic or thermosetting resin;
$b_2$) cutting the second sheet so as to create shavings formed of discontinuous fibres, pre-impregnated by a thermoplastic or thermosetting resin;
$b_3$) placing said shavings in a mould; and
$b_4$) compression moulding said shavings in the mould to obtain the second components.
    sub-steps $a_2$) and $b_3$) are carried out in the same mould and sub-steps $a_3$) and $b_4$) are carried out together, so that steps a) and b) are carried out together;
    sub-step $b_3$) is carried out in a mould in the presence of the first component obtained from sub-step $a_3$) so that steps a) and b) are subsequently carried out;
    step a) comprises the following sub-steps:
$a'_1$) providing a sheet made with continuous fibres, pre-impregnated by a thermoplastic or thermosetting resin;
$a'_2$) cutting the sheet so as to create shavings formed of long fibres, pre-impregnated by a thermoplastic or thermosetting resin;
$a'_3$) placing said shavings in a mould; and
$a'_4$) compression moulding said shavings in the mould to obtain the first component.
  step b) comprises the following sub-steps:
$b'_1$) providing at least one second sheet made with continuous fibres, pre-impregnated by a thermoplastic or thermosetting resin;
$b'_2$) cutting the second sheet so as to create shavings formed of long fibres, pre-impregnated by a thermoplastic or thermosetting resin;
$b'_3$) placing said shavings in a mould; and
$b'_4$) compression moulding said shavings in the mould to obtain the second components.
    sub-steps $a'_3$) and $b'_3$) are carried out in the same mould and sub-steps $a'_4$) and $b'_4$) are carried out together so that steps a) and b) are carried out together;
    step a) is carried out by pultrusion and wherein step b) is subsequently carried out by overmoulding by injection of a first component;
    step b) of overmoulding by injection is carried out with short fibres, namely discontinuous fibres presenting a length, non-zero and less than 100 microns, pre-impregnated by a thermoplastic or thermosetting resin.

BRIEF DESCRIPTION OF THE FIGURES

Other features and advantages of the invention will appear upon reading the following detailed description for the understanding of which, the appended drawings will be referred to, wherein.

DETAILED DESCRIPTION OF THE INVENTION

In the following description, by "long" fibres, this will be understood as fibres, of which the length is comprised between 1 mm and 70 mm, advantageously between 1 mm and 50 mm, or more advantageously, between 1 mm and 30 mm. Similarly, in the following description, by "short" fibres, this will be understood as fibres, of which the length is comprised between 1 micron and 1 mm, the latter value (1 mm) being excluded, advantageously between 1 micron and 500 microns, even more advantageously between 1 micron and 300 microns, even between 1 micron and 100 microns.

In the following description, a discontinuous fibre can therefore be either long or short.

Moreover, any fibre which is not discontinuous is assimilated to a continuous fibre.

Finally, the term "sheet" can equally designate a layer, in particular a layer of one-directional fibres, or a fabric.

The invention relates to a method for manufacturing a grille for a cascade type thrust reverser, of a jet engine, said method including the following steps:

a) manufacturing a first component including continuous or long fibres, pre-impregnated by a thermoplastic or thermosetting resin;

b) manufacturing, subsequently or together with step a), a series of second components each including discontinuous fibres, pre-impregnated by a thermoplastic or thermosetting resin, step b) being carried out such that the second components are, on the one hand, arranged transversally with respect to a longitudinal direction of the first component on at least one side of the first component and, on the other hand, spaced from one another according to this longitudinal direction, so as to form a comb-shaped structure, wherein the second components are consolidated to the first component.

Through this, the consolidation of second components (vanes) to the first components (strongbacks) does not require any particular step, contrary to the solutions proposed in the documents of the state of the art described above.

Figure 3:
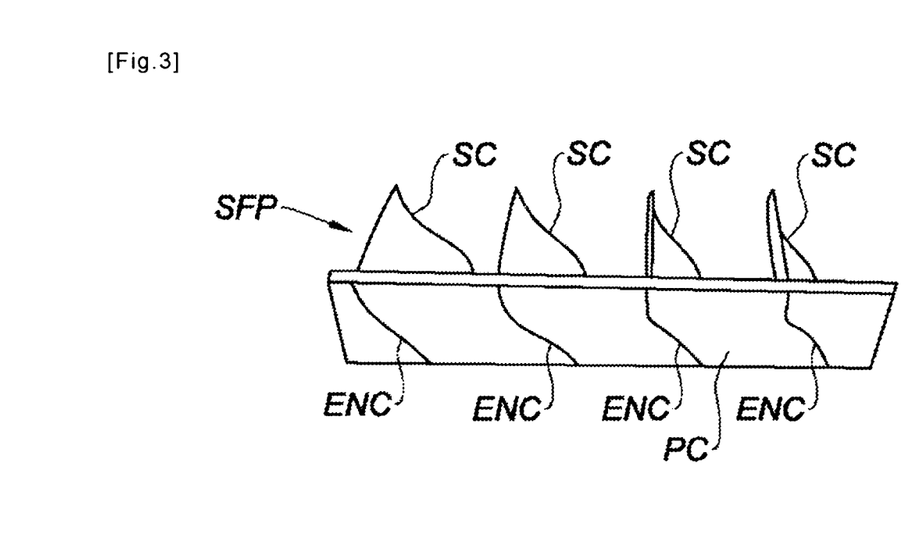
FIG. 3 represents, according to a perspective view, a comb-shaped structure obtained with the method according to the invention.

FIG. 3 represents a comb-shaped structure SFP obtained from step b).

Furthermore, a first component manufactured during step a) can comprise a series of notches ENC, each notch receiving a second component.

These notches ENC can, for example, be seen in FIG. 3 and are, in this case, formed in the mass of the first component, in other words, by making a slot in the thickness of the first component.

Figure 4:
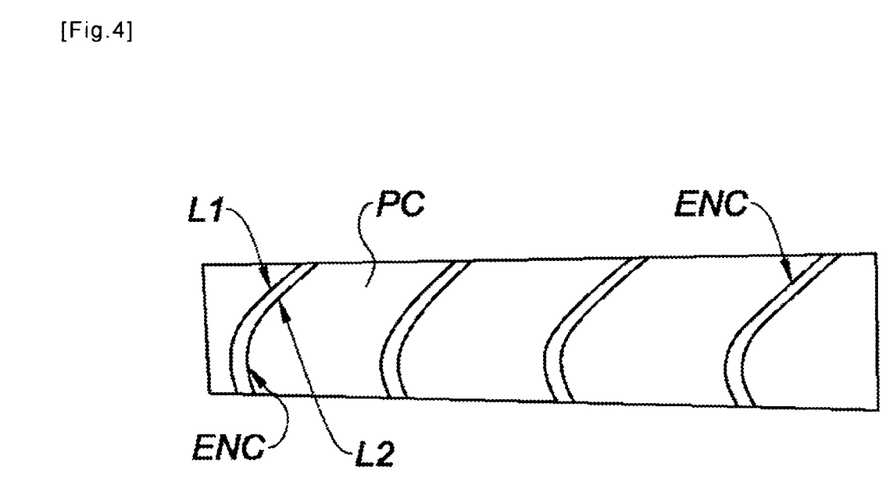
FIG. 4 represents, a side view of a comb-shaped structure obtained with the method according to the invention.

Such notches can also be seen in FIG. 4. In this FIG. 4, the notches are however obtained by making two lips L1, L2 in the excess thickness with respect to the first component, a slot thus being obtained between the two lips. Making a notch in this way makes it possible to conserve the thickness of the first component, therefore without risk of altering the mechanical performance of a first component. In addition, making a notch in this way makes it possible to rigidify the junction between a second component and a first component, so that the mechanical strength between these components is improved. Moreover, it must be noted that making the notch with such lips has no sensitive impact on the airflow passing through the cascade.

Figure 5:
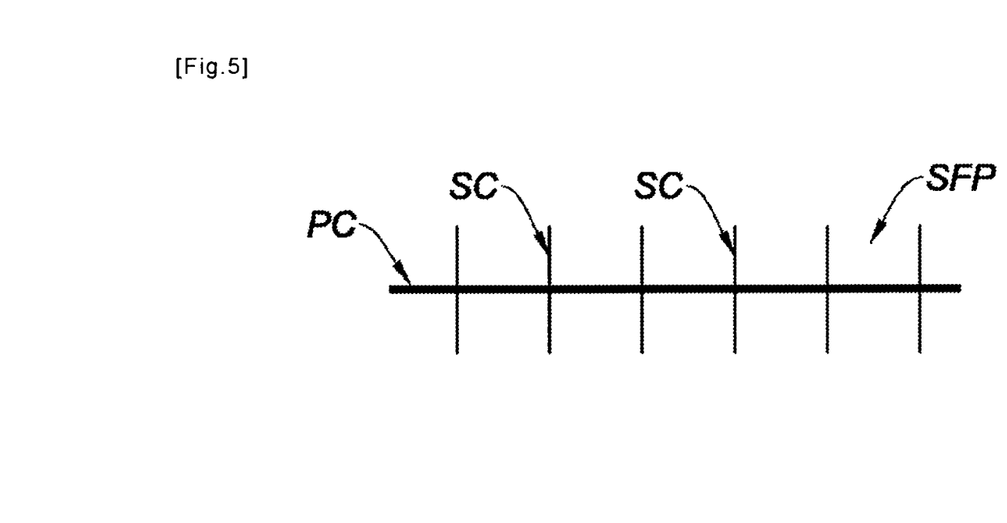
FIG. 5 represents, according to a schematic top view, another comb-shaped structure obtained with the method according to the invention.

Step b) can furthermore consist of securing second components to the first associated component on a second side of the first component, the second side being opposite the first side. In this case, the second components (vanes) extend on either side of a first component (strongback), as is represented according to a schematic top view in FIG. 5.

Mainly, two embodiments for implementing this method can be considered.

In a first embodiment, a compression moulding can be implemented, both for manufacturing the first components (step a)) and for manufacturing the second components (step b)).

More specifically, step a) then comprises the following sub-steps:

a$_1$) providing 101 at least one sheet made with continuous fibres, pre-impregnated by a thermoplastic or thermosetting resin;

a$_2$) placing 102 said at least one sheet in a mould;

a$_3$) compression moulding 103 said at least one sheet in the mould to obtain the first component.

It will be noted that it is advantageous to use continuous fibres to form a first component, which is intended to form a strongback of the grille, for questions of mechanical resistance.

More specifically, also, step b) thus comprises the following sub-steps:

b$_1$) providing 201 at least one second sheet made with continuous fibres, pre-impregnated by a thermoplastic or thermosetting resin;

b$_2$) cutting 202 the second sheet so as to create shavings formed of discontinuous fibres, pre-impregnated by a thermoplastic or thermosetting resin;

b$_3$) placing 203 said shaving in a mould; and b$_4$) compression moulding 204 said shavings in the mould to make the second components.

Figure 6:
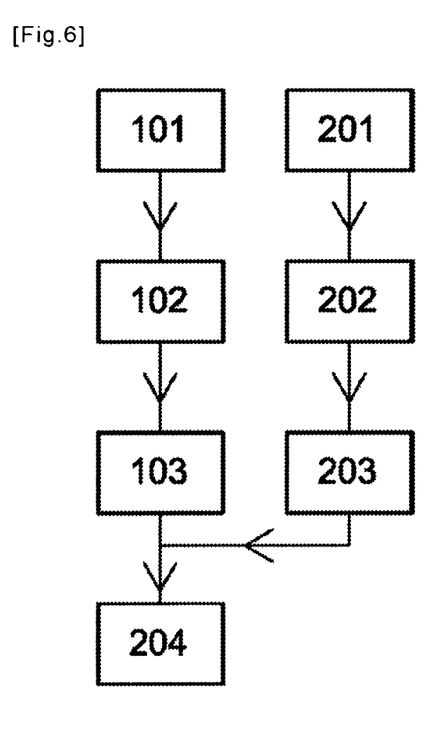
FIG. 6 represents different steps of a first implementation embodiment of the method according to the invention, according to a first variant.

When sub-step b$_3$), 203, is carried out in a mould in the presence of the first to component obtained from sub-step a$_3$), thus sub-step b$_3$) is carried out subsequently to sub-step a$_3$), 103. In fact, steps a) and b) are subsequently carried out. There are then two compression moulding operations, one for the first component and the other for the second components which will make it possible, over time, for the consolidation to the first component. Therefore, that being said, the compression moulding operation of the second components, being carried out in the presence of the first component, not only makes it possible to form the second components, but at the same time, to ensure the consolidation of the second components SC to the first component PC.

This option is represented in FIG. 6.

The interest in carrying out steps a) and b) as indicated above, resides in the fact that the first moulding makes it possible to ensure the alignment of the continuous fibres of the first component before the moulding of the second components is carried out.

Figure 7:
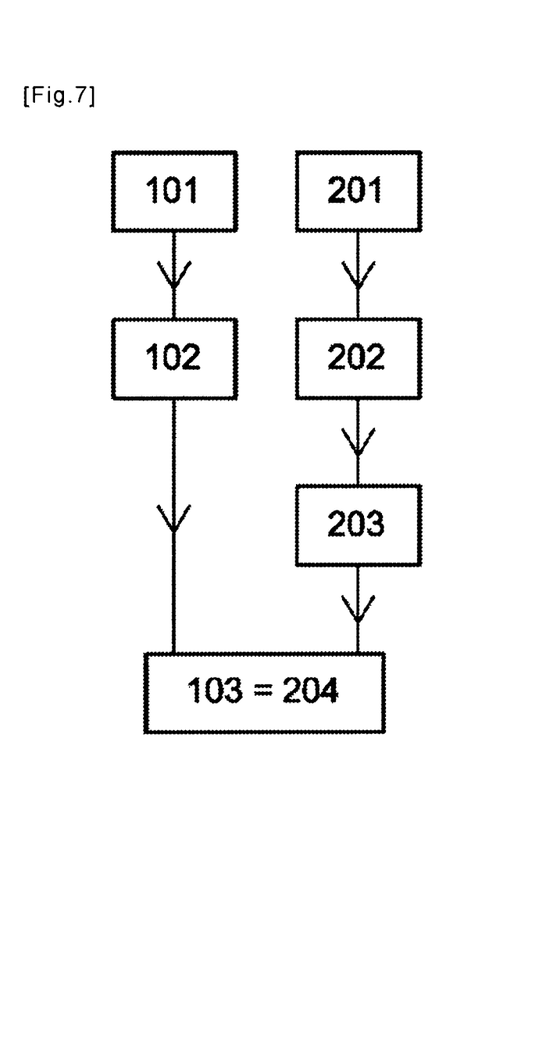
FIG. 7 represents different steps of this first implementation embodiment of the method according to the invention, according to a second variant.

On the contrary, when sub-steps $a_2$), 102, and $b_3$), 203, are carried out in the same mould, sub-steps $a_3$), 103, and $b_4$), 204, are implemented together. In fact, steps a) and b) are carried out together. Thus, the comb-shaped structure is formed with a first component and a series of second components in one single compression moulding operation, during which, what is more, the second components SC are secured to the first component. This variant is useful, as it makes it possible to save a little more manufacturing time, and therefore save a little more in manufacturing cost, by only finally providing for one single compression moulding step.

This other option is represented in FIG. 7.

Another variant can be considered for steps a) and b).

Indeed, above, the case is described where the fibres of the first component are continuous fibres and where the fibres of the second components are discontinuous, i.e. short or long.

Another useful case is however to implement, more specifically, long fibres for the first component and fibres which are as long for the second components.

Indeed, the long fibres for the first component, but also for the second components make it possible to maintain useful mechanical properties.

This can be achieved with two mouldings, one for the first component and the other for the second components, but this is advantageous in the case where both the first component and the second components are moulded at the same time.

Figure 8:
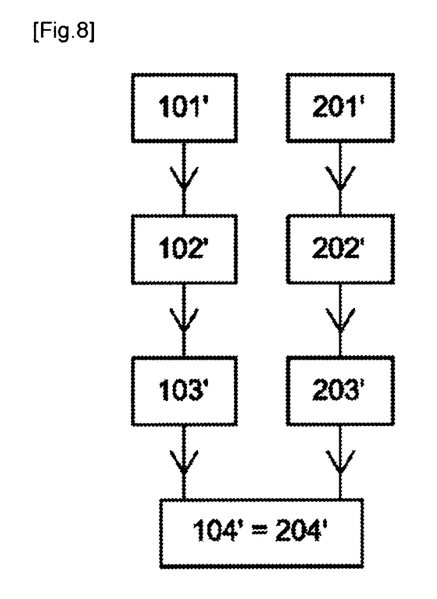
FIG. 8 represents different steps of this first implementation embodiment of the method according to the invention, according to a third variant.

FIG. 8 can be referred to.

Thus, step a) can comprise the following sub-steps:
$a'_1$) providing 101' a sheet made with continuous fibres, pre-impregnated by a thermoplastic or thermosetting resin;
$a'_2$) cutting 102' the sheet so as to create shavings formed of long fibres, pre-impregnated by a thermoplastic or thermosetting resin;
$a'_3$) placing 103' said shavings in a mould; and
$a'_4$) compression moulding 104' said shavings in the mould to obtain the first component.
Step b) can comprise the following sub-steps:
$b'_1$) providing 201' at least one second sheet made with continuous fibres, pre-impregnated by a thermoplastic or thermosetting resin;
$b'_2$) cutting 202' the second sheet so as to create shavings formed of long fibres, pre-impregnated by a thermoplastic or thermosetting resin;
$b'_3$) placing 203' said shavings in a mould; and
$b'_4$) compression moulding 204' said shavings in the mould to obtain the second components.

Advantageously, and moreover as represented in FIG. 8, sub-steps $a'_3$), 102' and $b'_3$), 103' are carried in the same mould and sub-steps $a'_4$), 103' and $b'_4$), 204' are carried out together, so that steps a) and b) are carried out together.

This makes it possible to limit the number of tools and to save time.

Figure 9:
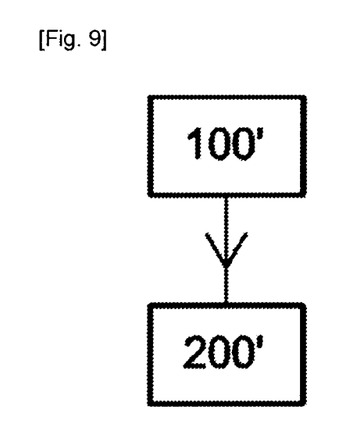
FIG. 9 represents different steps of a second implementation embodiment of the method according to the invention.

In a second embodiment, step a), 100', is carried out by pultrusion and step b), 200', is subsequently carried out by injection overmoulding a first component.

FIG. 8 can be referred to.

Pultrusion step a) is thus advantageously carried out with continuous or long fibres, pre-impregnated by a thermoplastic or thermosetting resin.

Injection overmoulding step b) is then advantageously carried out with short fibres, pre-impregnated by a thermoplastic or thermosetting resin. Indeed, the injection overmoulding is easier with short fibres.

Whatever the embodiment implemented, the fibres are advantageously selected from among carbon fibres, glass fibres, aramid fibres or a mixture of these Moreover, a thermoplastic resin can be selected from among polyamides (PA), polyphthalamides (PPA), phenylene polysulphides (PPS), polyetherimides (PEI), polyetheretherketones (PEEK) or polyetherketoneketones (PEKK).

Moreover, also, a thermosetting resin can be selected, selected from among epoxy or vinylester.

In particular, carbon fibres can be provided with a thermosetting resin of epoxy type, or carbon fibres with a thermoplastic resin or polyetherimide (PEI) type.

Whatever the embodiment implemented, the following steps can furthermore be provided to make a grille:
c) repeating steps a) and b) at least once, in order to obtain a comb-shaped structure, wherein the second components are consolidated to the first component;
d) arranging said comb-shaped structures obtained beforehand on a frame configured to be attached to said jet engine; and
e) securing the comb-shaped structures to said frame.

Figure 10:
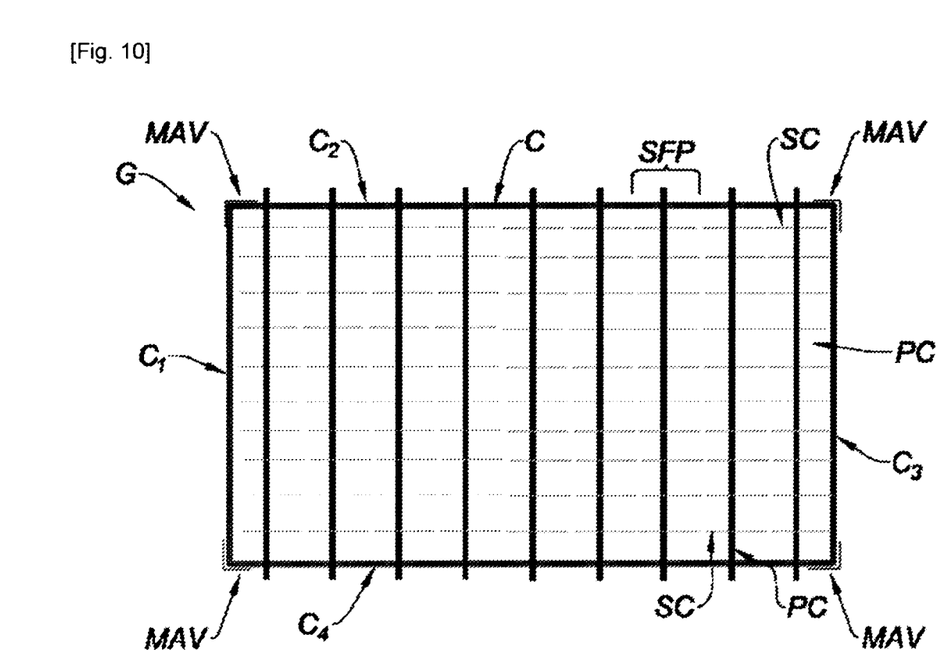
FIG. 10 schematically represents and according to a top view, a grille equipped with a frame and obtained according to method according to the invention.

FIG. 10 represents, schematically, a top view of the grille G obtained from step e). In this FIG. 10, several comb-shaped structures are observed arranged to the side of one another, each comb-shaped structure including a first component PC and a series of second components SC, as well as a frame C.

Furthermore, an additional step can be provided, advantageously implemented after step c), wherein two second components (vanes), of two different comb-shaped structures, are secured to one another, for example by welding and/or by bonding and/or by complementing shapes.

Figure 11:
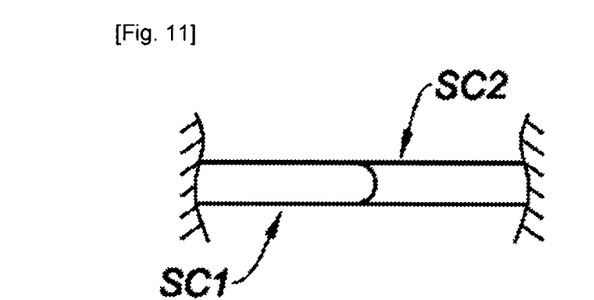
FIG. 11 represents a manner of securing two different comb-shaped structures of one same grille.

That is what is represented in FIG. 11. In this FIG. 11 indeed, a second component SC1 of a first comb-shaped structure and a second component SC2 of a second comb-shaped structure can be observed. The second components SC1 and SC2 here have both complementing shapes and a welding.

This makes it possible to rigidify the structure and consequently, to improve its mechanical properties. This also makes it possible to ensure a continuity of the grille without impeding, upon use, the airflow which is redirected towards the front of the aircraft during a landing.

To facilitate the implementation of step e), the frame C can comprise notches to receive each comb-shaped structure. Such notches are thus similar to those represented in FIG. 3 or 4 on a first component.

The frame can be made in different ways.

The frame can thus comprise four sides C1, C2, C3, C4 which are advantageously fixed two-by-two by removable fastening means MAV, schematically represented in FIG. 10. The fastening means can be rivets (non-removable solution) or corners fixed by a bolt system (removable solution). Making the frame after having made the different comb-shaped structures makes it possible for an easier adjustment of the grille.

Figure 12:
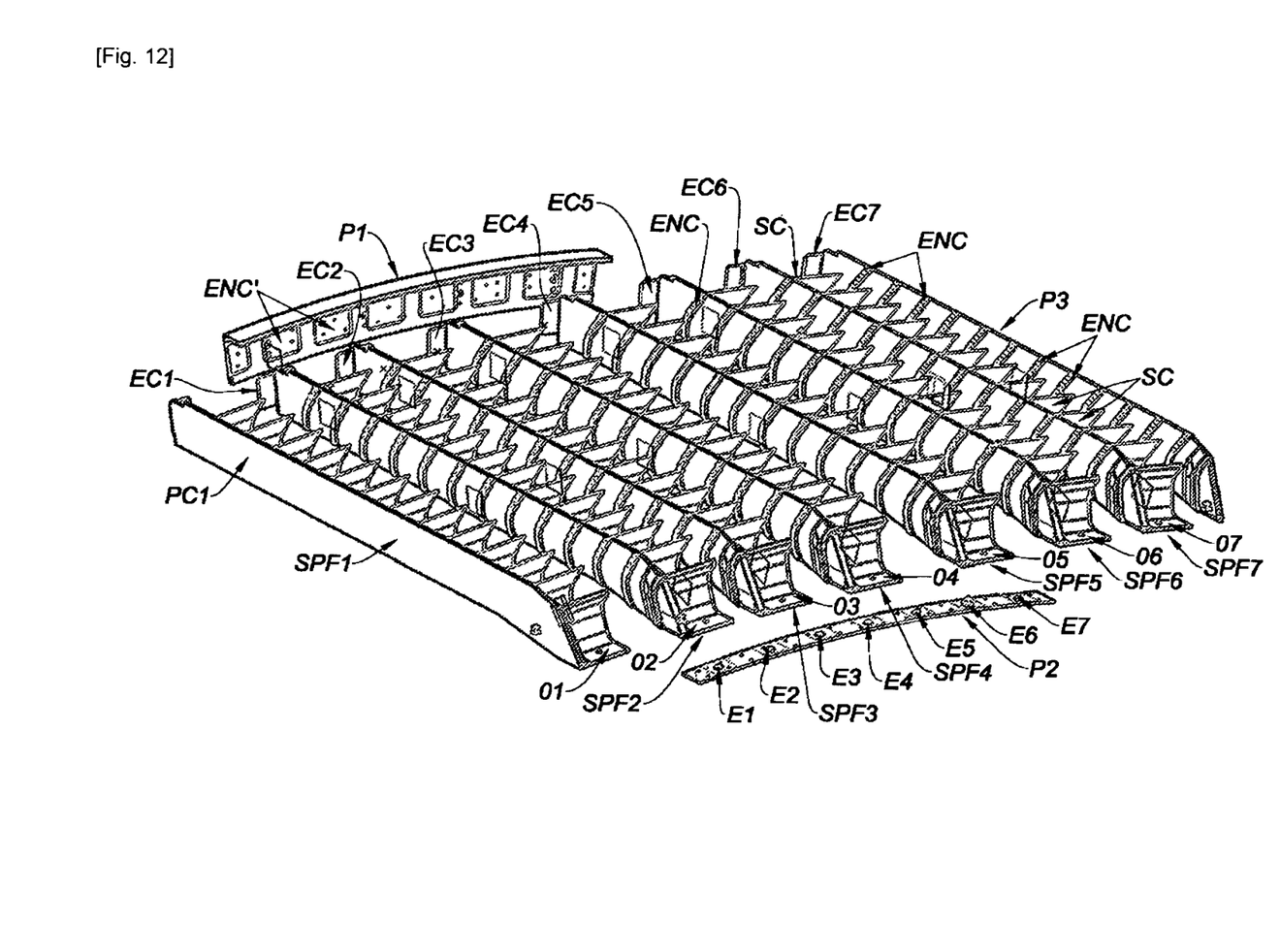
FIG. 12 schematically represents and according to a perspective view, a set of comb-shaped structures before their assembly to a particular frame.

The frame can also be made as presented in FIG. 12.

In this FIG. 12, the presence of a plurality of comb-shaped structures is noted, SPF1 to SPF7. Each of them is formed according to steps a) and b) of the method according to the invention.

The assembly which can be seen in FIG. 12 is therefore that which can be observed during assembly step d) before consolidation step e).

The presence of notches ENC are also noted on the comb-shaped structures SPF2 to SPF7.

The first component PC1 of the comb-shaped structure SPF1 forms an element of the frame.

The remainder of the frame comprises three other parts P1, P2, P3.

The part P3 is in fact a first component, without its second components, which comprises notches ENC capable of receiving the second components SC of the comb-shaped structure SPF7. It is advantageously placed on the side opposite side the first component PC1.

The part P2 is assimilable to a strip equipped with lugs E1 to E7 which are inserted in corresponding orifices O1 to O7 of the different comb-shaped structures. This part P2 makes it possible to connect all the comb-shaped structures. The strip shape is moreover simple to make, for example made of continuous fibres to ensure a good mechanical strength.

Finally, the part P1 is a part which also presents a series of notches ENC' aiming to engage with corresponding elements EC1 to EC7 provided at the respective ends of each of the first components of the different comb-shaped structures. This corresponding shape makes it possible to place the part P1 precisely with respect to the different comb-shaped structures. This also makes it possible to rigidify the junction by mechanical supports.

The frame is advantageously made of composite material. In particular, it advantageously comprises continuous fibres or long fibres, pre-impregnated by a thermoplastic or thermosetting resin.

An embodiment example will now be described.

In this example, steps a) and b) of the method are carried out together.

A sheet is started with, in this case a layer, of one-directional carbon fibres (UD), which are continuous. This layer is pre-impregnated by a thermoplastic resin of polyetherimide (PEI) type.

This layer is cut into shavings to form long fibres, in this case, of 12.7 mm×12.7 mm.

The shavings are introduced into a mould presenting a shape complementary to that of a comb, therefore, to form both a strongback (first component) and a set of vanes (second components).

The mould is closed to ensure a pressurising of around 30 bars and heated to a temperature greater than the melting temperature of the polyetherimide used as a resin.

This is therefore a compression moulding.

Then, and this absolutely conventionally, the mould is cooled to the vitreous transition temperature of the polyetherimide used as a resin, to ensure the demoulding of the comb-shaped part.

This operation can be repeated several times according to step c), to obtain all the parts useful to the complete formation of the grille.

Then, step d) of arranging with respect to a frame is implemented.

Final assembly step e) is thus carried out by welding using a dedicated tool, conventional in itself.

Whatever the embodiment considered, it must finally be noted, that the method to according to the invention makes it possible to manufacture parts including numerous undercut areas.

The invention claimed is:

1. A method for manufacturing a grille for a cascade type thrust reverser, of a jet engine, said method including the following steps:
   a) manufacturing a first component including long fibres, pre-impregnated by a thermoplastic or thermosetting resin; and
   b) manufacturing a series of second components each including discontinuous fibres, pre-impregnated by a thermoplastic or thermosetting resin, step b) being carried out such that the second components are, on the one hand, arranged transversally with respect to a longitudinal direction of the first component on at least one side of the first component and, on the other hand, spaced from one another according to this longitudinal direction, so as to form a comb-shaped structure, wherein the second components are consolidated to the first component,
   wherein step a) is carried out by pultrusion and wherein step b) is subsequently carried out by injection overmoulding of a first component.

2. The method according to claim 1, wherein a first component manufactured during step a) comprises a series of notches, each notch receiving a second component.

3. The method according to claim 1, wherein step b) furthermore consists of securing second components to the associated first component on a second side of the first component, the second side being opposite the first side.

4. The method according to claim 1, further including the following steps:
   c) repeating steps a) and b) at least once, in order to obtain at least one other comb-shaped structure, wherein the second components are consolidated to the first component;
   d) arranging said comb-shaped structures obtained beforehand on a frame configured to be attached to said jet engine; and
   e) securing the comb-shaped structures to said frame.

5. The method according to claim 4, wherein two second components, advantageously from step c), of two different comb-shaped structures, are secured to one another by welding and/or by bonding and/or by complementing shapes.

6. The method according to claim 4, wherein the frame comprises notches or, according to the case of lugs, to receive each comb-shaped structure.

7. The method according to claim 4, wherein the frame comprises four sides which are fixed two-by-two by removable fastening means.

8. The method according to claim 4, wherein the frame comprises continuous fibres or long fibres, pre-impregnated by a thermoplastic or thermosetting resin.

9. The method according to claim 1, wherein step a) comprises the following sub-steps:
   $a_1$) providing at least one sheet made with continuous fibres, pre-impregnated by a thermoplastic or thermosetting resin;
   $a_2$) placing said at least one sheet in a mould; and
   $a_3$) compression moulding said at least one sheet in the mould to obtain the first component.

10. The method according to claim 9, wherein step b) comprises the following sub-steps:
   $b_1$) providing at least one second sheet made with continuous fibres, pre-impregnated by a thermoplastic or thermosetting resin;
   $b_2$) cutting the second sheet so as to create shavings formed of discontinuous fibres, pre-impregnated by a thermoplastic or thermosetting resin;
   $b_3$) placing said shavings in a mould; and
   $b_4$) compression moulding said shavings in the mould to obtain the second components.

11. The method according to claim 1, wherein step a) comprises the following sub-steps:
   a'$_1$) providing a sheet made with continuous fibres, pre-impregnated by a thermoplastic or thermosetting resin;
   a'$_2$) cutting the sheet so as to create shavings formed of long fibres, pre-impregnated by a thermoplastic or thermosetting resin;
   a'$_3$) placing said shavings in a mould; and
   a'$_4$) compression moulding said shavings in the mould to obtain the first component.

12. A method for manufacturing a grille for a cascade type thrust reverser, of a jet engine, said method including the following steps:
   a) manufacturing a first component including continuous or long fibres, pre-impregnated by a thermoplastic or thermosetting resin;
   b) manufacturing, subsequently with step a), a series of second components each including discontinuous fibres, pre-impregnated by a thermoplastic or thermosetting resin, step b) being carried out such that the second components are, on the one hand, arranged transversally with respect to a longitudinal direction of the first component on at least one side of the first component and, on the other hand, spaced from one another according to this longitudinal direction, so as to form a comb-shaped structure,
   wherein the second components are consolidated to the first component,
   wherein step a) is carried out by pultrusion and wherein step b) is subsequently carried out by injection overmoulding of a first component, and
   wherein injection overmoulding step b) is carried out with short fibres, namely discontinuous fibres presenting a length, non-zero and less than 100 microns, pre-impregnated by a thermoplastic or thermosetting resin.

13. The method according to claim 12, wherein a first component manufactured during step a) comprises a series of notches, each notch receiving a second component.

14. The method according to claim 12, wherein step b) furthermore consists of securing second components to the associated first component on a second side of the first component, the second side being opposite the first side.

15. The method according to claim 12, further including the following steps:
   c) repeating steps a) and b) at least once, in order to obtain at least one other comb-shaped structure, wherein the second components are consolidated to the first component;
   d) arranging said comb-shaped structures obtained beforehand on a frame configured to be attached to said jet engine; and
   e) securing the comb-shaped structures to said frame.

16. A method for manufacturing a grille for a cascade type thrust reverser, of a jet engine, said method including the following steps:
   a) manufacturing a first component including continuous or long fibres, pre-impregnated by a thermoplastic or thermosetting resin;
   b) manufacturing, subsequently or together with step a), a series of second components each including discontinuous fibres, pre-impregnated by a thermoplastic or thermosetting resin, step b) being carried out such that the second components are, on the one hand, arranged transversally with respect to a longitudinal direction of the first component on at least one side of the first component and, on the other hand, spaced from one another according to this longitudinal direction, so as to form a comb-shaped structure, wherein the second components are consolidated to the first component;
   c) repeating steps a) and b) at least once, in order to obtain at least one other comb-shaped structure, wherein the second components are consolidated to the first component;
   d) arranging said comb-shaped structures obtained beforehand on a frame configured to be attached to said jet engine; and
   e) securing the comb-shaped structures to said frame, wherein the frame comprises four sides which are fixed two-by-two by removable fastening means.

17. The method according to claim 16, wherein the frame comprises continuous fibres or long fibres, pre-impregnated by a thermoplastic or thermosetting resin.

18. The method according to claim 16, wherein the frame comprises notches or, according to the case of lugs, to receive each comb-shaped structure.

* * * * *